Nov. 29, 1966  R. W. VOCKROTH, JR  3,288,364
COMPARISON MATRIX
Filed Nov. 18, 1964
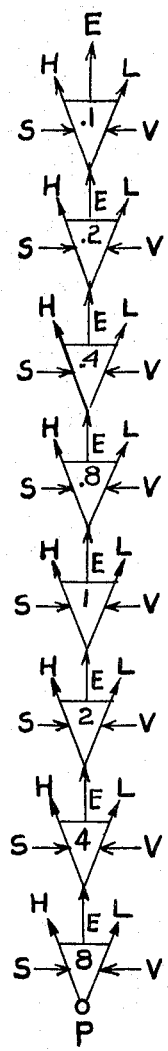
INVENTOR.
RICHARD W. VOCKROTH JR.
BY Clarence R. Patty, jr
ATTORNEY United States Patent Office 3,288,364
Patented Nov. 29, 1966

3,288,364
COMPARISON MATRIX
Richard W. Vockroth, Jr., Painted Post, N.Y., assignor to Corning Glass Works, Corning, N.Y., a corporation of New York
Filed Nov. 18, 1964, Ser. No. 414,495
10 Claims. (Cl. 235—201)

This application is a continuation-in-part of my co-pending application Serial No. 249,503, filed January 4, 1963, and now abandoned.

This invention relates to a matrix for comparing a variable signal with a standard or command signal, and more particularly to a network of center-stable tri-legged fluid amplifiers connected in series for comparing a fluid signal representing a variable or unknown numerical value with a command or standard fluid signal representing a desired known numerical value, both represented in numerically-coded form.

In the past, it has been the general practice to utilize pneumatic systems solely as a source or supply of power to operate various pneumatic devices such as pneumatic tools. The systems utilized for supplying power usually operated under an "on-off" principle, wherein operating pneumatic power was supplied by the system, or the system was turned "on," when a valve was actuated.

With the advent of fluid amplifiers, I found that pneumatic power may now be utilized to control the operation of various devices rather than just supply the on-off operating power thereto. In order to control pneumatically such devices, however, it is necessary to relate or compare a signal representing the present attitude of such device with a signal representing a standard attitude so that the device may be directed to a desired attitude or positionment. The attainment of such result necessitates the utilization of pressurized fluid networks, such as that of the present invention, which must coact to do more than just turn the fluid on and off.

The matrix of the present invention includes a plurality of tri-legged center stable fluid amplifiers or fluid comparators arranged in series such that the equality or equal output signal of a fluid amplifier will supply the power stream for the next succeeding fluid amplifier. The fluid comparator type of fluid amplifier utilized in my novel comparison matrix has a left, a right, and a center fluid output channel or passage for receiving and outwardly directing the power stream applied to the fluid amplifier. A power stream inlet is provided at the base of the amplifier and at least one control input orifice is provided on each side of the amplifier, so that unbalanced control streams introduced therethrough will react with the power stream to deflect the power stream outwardly through either the left or right fluid output channel or passage. The center fluid output channel or passageway is preferably formed as a "preferred" channel so that when control inputs on the opposite sides of the amplifier are equal or when no control input is present on either side, the power stream will flow outwardly therethrough. Such tri-legged center stable fluid amplifiers are known in the art as shown in Figure 1 on page 42 of Fluid Jet Control Devices, published by American Society of Mechanical Engineers, November 28, 1962.

It has been an object of the invention to provide a comparison matrix for utilization with fluid systems.

A further object of the invention has been to provide an improved network of fluid amplifiers for comparing a variable fluid signal with a standard or command fluid signal to determine the relative values thereof.

An additional object of the invention has been to provide a series arrangement of fluid amplifiers, having high, low, and equal output passages or channels for comparing the presence or absence of the various bit levels of a variable fluid signal representing an unknown value with those of a standard fluid signal representing a known value wherein an indication will be present at a high output channel when the variable signal is higher than the standard signal, an indication will be present at a low output channel when the variable signal is lower than the standard signal, and a signal will be present at an equal output channel for supplying a power stream to the next succeeding fluid amplifier when the variable signal is equal to the standard signal.

These, and other objects of my invention will be more apparent to those skilled in the art from the following specification and accompanying drawing which discloses a schematic diagram of a plurality of fluid amplifiers arranged in series forming a comparison matrix embodying my invention.

Referring now to the drawing, a plurality of tri-legged center stable fluid amplifiers, .1, .2, .4, .8, 1, 2, 4 and 8 are shown arranged in series. Each of the fluid amplifiers has three outlet passageways or fluid channels, including a "high" channel H, an "equal" channel E, and a "low" channel L. In addition, each of the amplifiers is shown provided with at least one control input on each side thereof, such as a standard or known command signal input S on one side thereof and a variable or unknown signal V on the opposite side. A power stream input P is shown applied to the base of fluid amplifier 8 whereas the "equal" fluid channel E of amplifiers 8, 4, 2, 1, .8, .4, and .2, when pressurized, supplies the power stream to fluid amplifiers 4, 2, 1, .8, .4, .2, and .1 respectively.

Each of the fluid amplifiers .1–8 is utilized to compare a different binary bit level of a coded number. For example, the .1 amplifier makes a comparison between the presence or absence of a control stream at S representing the .1 bit level of a standard or known command signal, and the presence or absence of a control stream at V representing the presence or absence of the .1 bit level of a variable or unknown signal. In a like manner, the .2 amplifier compares with the .2 bit level of such coded signals, the .4 amplifier compares with the .4 bit level of such signals and so on.

Of course, bit levels other than that illustrated in the drawing may be utilized, and the range of comparison may be adjusted to suit various circumstances, such as by adding additional amplifiers and/or shifting the values compared. For example, the lower limit of comparison may be shifted down to .001 and/or the upper limit may be extended to 80. Since the comparison made by the fluid amplifiers is one of comparing the presence or absence of a fluid signal representing a numerical value, rather than a comparison of the relative magnitude of external pressures, other values than the widely used binary-coded-decimal system or "BCD" may be used.

It will be understood that the pressure signal supplied to the control stream inputs S, V, of the various fluid amplifiers, may be derived from manually operated valves connected to a fluid pressure source, or a programmed tape or sensing device supplied with a plurality of pressure lines, each representing a particular bit level. The pressure of the source supplied at command control input S is of the same magnitude as the pressure supplied at variable control input V for each amplifier, so that it is the presence or absence of such signal rather than the magnitude of the pressure which is being compared.

Since the command signal is a known signal of desired value, it is preset and easily supplied to comparison matrix by operating a plurality of hand valves, which connect a fluid pressure source to the control inputs S of the various fluid amplifiers representing the desired binary-coded numerical value. The numerical value of the variable fluid signal, on the other hand, will of course change with the status or location of the unknown being examined. The various variable control inputs V may be connected to a fluid pressure source to represent the numerical value of the unknown signal by means of an encoder such as illustrated in co-pending application Serial No. 261,725, filed February 28, 1963, now Patent No. 3,239,142, which illustrates one mode of a pneumatic sensing device with a digital readout. Other modes of supplying the variable signal to the comparison matrix, which might be used, are shown in Turnbull patent, 1,936,416, and Wadey patent, 3,076,473. It should be appreciated, however, that the generation and utilization of the fluid pressure signals may be accomplished in a number of well known manners and since the present invention is not primarily concerned with these features, they are not discussed at length but only mentioned in passing.

As previously mentioned, the magnitude of the various control signals are maintained constant by providing a constant source of pressure for both the command signal and the variable signal. The duration of pressure at the various command control inputs S, representing a desired numerical value, will remain constant as long as the preset control valves are left in their open position in communication with the fluid pressure source. No pressure will be supplied at a command input S when the control valve communicating between the input and the fluid pressure source is closed. The duration of the fluid pressure at the variable control signal input V will, of course, change as the status or location of the variable being examined changes, and such change will be reflected by the readout device as above mentioned. That is, the duration of fluid pressure at the variable control inputs V will be determined by the rate at which the status or location of the unknown is allowed to change.

Unequal output flows through channel H or channel L will be re-established through the center channel E upon a change in control inputs, determined by the location or status of the unknown signal, when the change results in equality of control inputs. That is, when an amplifier has the presence of a signal at both standard control input S and variable control input V or the absence of a signal at both inputs S and V, the outlet flow will be through center channel E. An unequal output will remain in its deflected position until the deflecting control signal stream is eliminated or a balancing control stream is supplied, whereupon the power stream will pass outwardly through the center compare-equal channel.

In operation, the highest bit level is compared first, with succeeding lower order bit levels being compared in succession as the next higher bit level compares equal. If, for example, the 8 amplifier receives a variable control stream at V, but is not supplied with a standard control stream at S, then the power stream would be deflected to the left and out the "high" fluid channel, indicating that the variable or unknown signal supplied at V is higher than the standard or command signal supplied at S. In such a case, the value of the variable or unknown signal must be either 8 or higher, whereas the value of the known or command signal must be less than 8. As the variable signal is reduced to a value of 7, amplifiers 1, 2, and 4 representing the 1 bit level, 2 bit level, and 4 bit level of the numeral 7 will have control streams presented at V by means of the sensing device. Amplifier 8, however, will not have a control stream presented at V, since the 8 bit level is not present in a binary coded representation of a 7 value. Further, since the command signal is preset, it remains constant and, since in this instance it is less than 8, there will be no control stream at S either. As a result, no control inputs are supplied to amplifier 8 and the control stream is undeflected, and accordingly leaves the amplifier via the middle or equal output passage or fluid channel E and becomes the power stream input to amplifier 4.

As the value of the variable signal decreases, each lower order amplifier will in turn indicate equality as the middle "equal" output passage or fluid channel is pressurized by an undeflected power stream, whose output functions to furnish a power stream to the next lower-order amplifier in series. When the .1 amplifier indicates equality by the pressurization of output channel E, the value of the variable signal applied at V is, for all practical purposes, equal to the value of the command signal applied at S, with any difference therebetween being less than .1. The inequality outlet channels of the various amplifiers may be connected to a suitable readout device such as shown in Warren Patent No. 3,001,698.

When the variable signal applied at V is less than the standard or command signal applied at S, the power stream supplied to the comparing amplifiers or comparators will be deflected to the right, and outwardly through the "low" fluid channel L, thus indicating that the variable signal is lower than the standard signal. As before, the comparison matrix compares the highest bit level first, and then on down the line to the lowest bit level, with each succeeding bit level being compared after the next higher bit level has compared equal, inasmuch as the power stream for each succeeding amplifier is supplied by the "compare-equal" output of its next preceding amplifier. Therefore, the various amplifiers along the series may indicate "high" or "low" by outputs H and L, respectively, depending upon whether the variable signal is higher or lower than the standard signal, before the variable signal is adjusted to compare equally with the standard signal.

As an illustration, if the command signal has a value of 7.6, then the 4 bit level amplifier, the 2 bit level amplifier, and the 1 bit level amplifier, the .4 bit level amplifier, and the .2 bit level amplifier would have their control inputs S connected by suitable valves to a fluid pressure source. Now, if the variable signal is at a present value of 5.3, the 4 bit level amplifier, the 1 bit level amplifier, the .2 bit level amplifier, and the .1 bit level amplifier would have their control stream inputs connected to a fluid pressure source by means of a previously mentioned sensing device or encoder V. With a power stream supplied at P at amplifier 8, the stream would be undeflected since there is an absence of both control inputs to amplifier 8, and accordingly it would pass outwardly through the "equal" or middle passage providing a power stream to fluid amplifier 4. Since control inputs are present at both S and V in fluid amplifier 4, the power stream would again be undeflected and pass outwardly through the "equal" output channel E thus providing a power stream to fluid amplifier 2. Since fluid amplifier 2 is provided with a control input at S but not at V, a power stream supplied thereto would be deflected to the right and outwardly through the "low" output channel L, thus indicating that the variable signal is lower than the standard signal. Further, since there is no power stream supplied to the succeeding fluid amplifiers of lower order, no comparison is made in these amplifiers until the value of the variable signal is adjusted at the higher levels.

If the variable signal changed to a value of 6 then the sensing device would only provide pressure at control inputs V of the 4 bit level and 2 bit level fluid amplifiers, however, since the value of the command or standard signal is preset or remains constant, the control inputs at S remain unchanged. Accordingly, a power stream supplied at P to fluid amplifier 8 would again pass undeflected through amplifier 8, since there are no control flow inputs to amplifier 8, and would also pass undeflected through amplifiers 4 and 2 since they are both provided with equal and opposite control input streams. However, the power stream upon entering fluid amplifier 1 would be deflected outwardly through the "low" output channel, since a control stream is supplied at S and not at V, thus indicating that the value of the variable signal is lower than the standard or command signal. Again the lower order fluid amplifiers would not be pressurized since the power stream, having been deflected, would not be available. The value of the variable signal would be continually increased until all of the fluid amplifiers compared equal and the power stream emerged from amplifier .1 through the compare-equal channel E.

Although I have disclosed the now preferred embodiment of my invention, it will be readily apparent to those skilled in the art that various changes and modifications may be made thereto without departing from the spirit and scope thereof as defined in the appended claims.

I claim:

1. A comparison matrix comprising a plurality of fluid amplifiers arranged in series, a power stream input at one end of said series, means for supplying control input streams to opposite sides of each of said fluid amplifiers, and a compare-equal output passage extending from each fluid amplifier to provide a power stream input to a next succeeding fluid amplifier, when pressurized responsive to said control input supply means.

2. A network for comparing fluid signals which comprises, a plurality of fluid amplifiers arranged in series with a central output passage of each preceding fluid amplifier when pressurized providing a power stream to the next succeeding fluid amplifier, means communicating with opposite sides of each fluid amplifier of said series for supplying a different pair of equal bit levels of two fluid signals to be compared to each said fluid amplifier, and means providing a power stream to the first fluid amplifier within the series.

3. A network as defined in claim 2 wherein said series of fluid amplifiers is arranged so that the various bit levels are compared in descending order.

4. A network as defined in claim 2 wherein said power stream means is supplied to the base of a fluid amplifier for comparing the highest bit level compared by the series.

5. A comparison matrix for comparing the relative value between a pair of fluid signals which comprises, a plurality of fluid amplifiers, each fluid amplifier having means for comparing a different bit level of the numerical value of the signals being compared; each of said fluid amplifiers having two outlet passageways for indicating inequality between the compared signals, and a third outlet passageway of each fluid amplifier, when pressurized, providing a power stream input for the amplifier comparing the next lower bit level; and means for supplying a power stream to the amplifier comparing the highest bit level sensed by the matrix.

6. An improved system having an inlet and outlet end for comparing an unknown fluid signal such as a variable signal with a known fluid signal such as a standard signal which comprises, a plurality of connected fluid amplifiers, means for introducing a control stream representing a different bit level of a known fluid signal into one side of each of said fluid amplifiers, means for introducing a control stream representing a different bit level of a variable signal into an opposite side of each of said amplifiers such that each fluid amplifier may compare one bit level of the variable signal with the same bit level of the known signal; each of said fluid amplifiers having at least one outlet channel for indicating inequality between the control streams supplied at such bit level, and an outlet channel for indicating equality of such control streams; the equality outlet channel of each said fluid amplifiers, with the exception of the amplifier at the outlet end of the system, when pressurized, supplying a power stream to the next connected fluid amplifier in the system; and means for supplying a power stream to the fluid amplifier at the inlet end of the system.

7. An improved system as defined in claim 6 wherein said fluid amplifiers are arranged in decreasing bit level order, and are connected together in series with the equality outlet channel for each preceding fluid amplifier providing a power stream inlet for the next succeeding lower-order fluid amplifier, and said means for supplying a power stream being connected to the highest-order fluid amplifier.

8. A network for comparing the numerical magnitude of a pair of fluid signals represented in binary-coded form which comprises, a plurality of fluid comparators arranged in series, each of said fluid comparators being a tri-legged center-stable fluid amplifier having a control stream inlet on each side thereof; the control stream inlet on one side of each of said comparators being adapted to receive a different bit level of one of the signals to be compared, with the control inlet on the opposite side of each fluid amplifier adapted to receive the same bit level as the inlet on the one side, but from the other signal to be compared; means for introducing a power stream into each of said comparators; and the center-stable outlet leg of said tri-legged amplifiers adapted to receive the power stream when it is undeflected by inputs at said control inlets.

9. A comparison matrix for comparing the value of a variable fluid signal with that of a known fluid signal which comprises, a plurality of fluid amplifiers arranged in series, each fluid amplifier having control inlet means on one side thereof for receiving a different bit level of the variable fluid signal, control inlet means on the opposite side of each of said fluid amplifiers for receiving the same bit level as may be introduced on the one side thereof but from the known fluid signal, power stream input means communicating with each fluid amplifier; each fluid amplifier having an outlet channel for receiving a deflected power stream when the variable signal compares higher than the known signal, a second outlet channel for receiving a deflected power stream when the variable signal compares less than the known signal, and an outlet channel for receiving an undeflected power stream when the signals compare equal; and said compare-equal outlet channel, when pressurized, providing a power stream to the next succeeding fluid amplifier within the series.

10. A network for comparing the numerical value of a pair of fluid signals represented in binary-coded form which comprises; a plurality of fluid amplifiers connected in series including a first fluid amplifier for comparing the highest bit level of the fluid signal, means for supplying a continuous power stream to said first fluid amplifier, a plurality of intermediate fluid amplifiers for comparing successive descending bit levels of the fluid signals, a terminal fluid amplifier for comparing the lowest desired bit level of the fluid signal having outlets for attaching a suitable readout device; fluid inlet means on opposite sides of each of said fluid amplifiers for introducing one bit level of each of the fluid signals in opposed relationship to each other; a plurality of outlet passages formed in each of said fluid amplifiers for receiving a deflected power stream when the opposed fluid signals supplied thereto are unequal; a preferred central outlet passageway formed in each of said fluid amplifiers for receiving an undeflected power stream when the opposed fluid signals supplied thereto are equal; and said central preferred outlet passage of each of said fluid amplifiers with the exception of said terminal amplifier, when pressurized, providing a power stream to the next succeeding fluid amplifier within the series.

References Cited by the Examiner
UNITED STATES PATENTS

| | | | |
|---|---|---|---|
| 3,001,698 | 9/1961 | Warren | 235—201 |
| 3,076,473 | 2/1963 | Wadey | 235—201 |
| 3,080,886 | 3/1963 | Severson | 235—201 X |
| 3,093,306 | 6/1963 | Warren | 235—201 |
| 3,114,390 | 12/1963 | Glattli | 235—201 |
| 3,122,165 | 2/1964 | Horton | 235—201 X |
| 3,193,197 | 7/1965 | Bauer | 235—201 |

OTHER REFERENCES

Article, "Analog Pure Fluid Amplifier," appearing in Fluid Jet Control Devices, published by A.S.M.E., November 28, 1962, pages 41–49.

"Hydraulics Half-Add Binary Numbers," article by F. D. Ezekiel et al., Control Engineering, February 1961, page 145.

RICHARD B. WILKINSON, *Primary Examiner.*

LOUIS J. CAPOZI, *Examiner.*

T. J. ANDERSON, *Assistant Examiner.*